Nov. 10, 1931.   G. W. ADAMS   1,831,794

CAMERA CASING AND METHOD OF MAKING SAME

Filed March 28, 1930

Inventor:
George W. Adams,
Newton M. Perrins,
Donald H. Stewart,
Attorneys

Patented Nov. 10, 1931

1,831,794

UNITED STATES PATENT OFFICE

GEORGE W. ADAMS, OF ROCHESTER, NEW YORK, ASSIGNOR TO EASTMAN KODAK COMPANY, OF ROCHESTER, NEW YORK, A CORPORATION OF NEW YORK

CAMERA CASING AND METHOD OF MAKING SAME

Application filed March 28, 1930. Serial No. 439,649.

This invention relates to photography, and more particularly to the forming of light-proof joints in camera casings.

One object of my invention is to form a joint in a camera casing in the minimum amount of time.

Another object of my invention is to provide a joint in a camera casing quickly, said joint being light proof.

Still another object of my invention is to provide a light-proof joint in a camera case without the operation of soldering, thereby eliminating the corrosive and other ill effects of soldering flux.

A further object is to provide a metal slug for the forming of a light-proof joint in a camera casing.

A still further object is to join two camera walls and to make said joint light proof in the same operation.

To these and other ends the invention results in certain improvements and combination of parts, all as will be hereinafter fully described, the novel features being pointed out in the claims at the end of the specification.

In the drawings wherein like parts are designated by like reference characters throughout:

Heretofore it has been the practice, in making sheet metal camera casings, to form joints by spot welding or riveting the joints of said casings, and then soldering the cracks to make the casings light proof. This method is undesirable because it requires two operations and therefore more time, it deforms the outside of the casing, and requires the use of soldering flux which later causes rust and corrosion. I have reduced these objections to a minimum and have employed the above-listed drawings to illustrate my invention, which I shall now describe.

Figure 1:
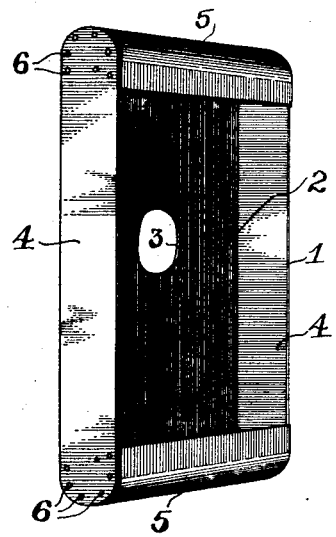
Figure 1 is a perspective of a casing for a folding camera constructed in accordance with and embodying a preferred form of my invention.
Figure 2:
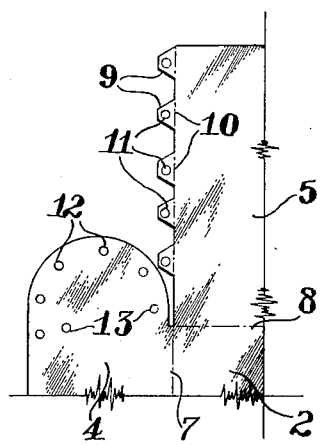
Figure 2 is a plane view of a fragment of a blank from which the casing is formed.

In Figure 1 an ordinary camera casing 1, formed from one piece of sheet metal, is provided with a back wall 2 having an aperture 3 for the usual red window for viewing the numbers on the film backing paper, side walls 4 and curved end walls 5. In the illustrated embodiment of my invention the curved end walls 5 are joined to the side walls 4 as by the rivets 6 seen in Figure 1 which are extruded from a rod which also forms a light-tight joint. To form this casing and joint a blank is cut from a metal sheet, a fragment of which is shown in Figure 2, comprising portions for the back wall 2, side wall 4 and curved end wall 5, the side wall being bent on line 7 and the curve of the end wall starting at line 8.

Figure 3:
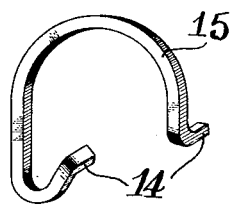
Figure 3 is a perspective of the metal slug used in my invention.
Figure 6:
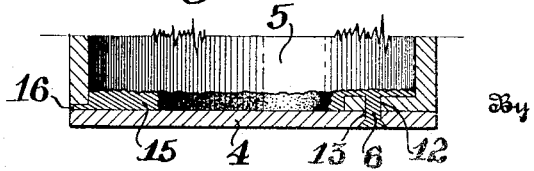
Figure 6 is a section taken on line VI—VI of Figure 4 after the joint has been made.

Extending laterally from the edge of the end wall 5 are tongues 9 adapted to be bent at right angles to the plane of the end wall at lines 10. The tongues 9 are provided with perforations 11 which, when the casing has been formed, corresponds with the perforations 12 around the ends of the side walls 4. There are also two other perforations 13 in the side walls 4 in which the lugs 14 of the metal slug 15 are seated. The slug 15 is formed, preferably from square aluminum rod, into a horseshoe shape (Figure 3) having its ends bent over into said lugs 14. The perforations 12 and 13 in the side walls 4 are countersunk from the outside as shown in Figure 6.

Figure 4:
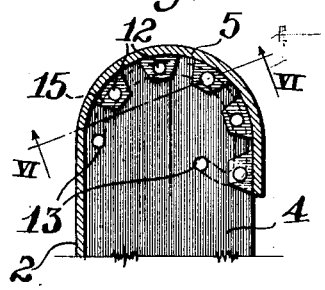
Figure 4 is a sectional view of an end of a camera casing before the joint has been made.
Figure 5:
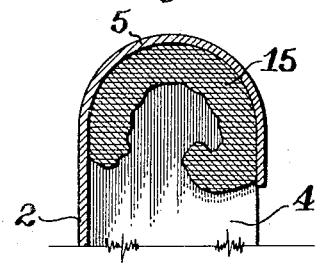
Figure 5 is a sectional view of the end of a camera casing after the joint has been made.

In the operation of forming my light-proof joint a blank is cut and formed into a casing, the tongues 9 being flush with the side walls 4 and the perforations 11 of said tongues 9 superimposing the perforations 12 in the side walls 4, one of the metal slugs 15 is located in the curved end of said casing so that it covers the tongues and their perforations as shown by dotted lines in Figure 4 and is anchored there by seating the lugs 14 of said slug 15 in the perforations 13. The joint is now ready for sealing, which is done by the use of great pressure. From the exertion of the pressure on the slug 15 it is caused to flow into all the crevices, cracks and perforations in the curved end and the side walls, filling said cracks and forming rivets in said perforations, as in the crack 16 between the end wall 5 and the side wall 4, and the rivet 6 in the perforations 11 and 12 shown in Figure 6. Thus a light proof joint is made, filling the cracks, which would otherwise admit light, and filling the perforations, to form the rivets and a firm connection, in one operation, without disfiguring or deforming the casing, and without the use of a corrosive soldering flux.

It will be noted that the camera casing having the general embodiments described above will be extremely easy to manufacture at a low cost, as the parts are few and simple to construct and operate.

It is obvious that the embodiments described above are by way of illustration only, and that I contemplate as within the scope of my invention all such forms as may come within the scope of the appended claims.

Having thus described my invention, what I claim as new and desire to secure by Letters Patent is:

1. The method of joining two perforated camera walls comprising flowing metal through and about the perforated walls by pressure, thereby forming a joint and light-proofing in the same operation.

2. The method of joining two perforated camera walls comprising placing said perforated walls in juxtaposition, flowing metal through and about the perforated walls by pressure, thereby forming a joint and light-proofing in the same operation.

3. The method of joining two perforated camera walls comprising placing a soft metal member adjacent one of said perforated walls, flowing the metal of said member through and about the perforated walls by pressure, thereby forming a joint and light-proofing in the same operation.

4. The method of joining two camera walls, including perforating said walls, placing said perforated walls in juxtaposition, placing a soft metal member adjacent one of said perforated walls, applying pressure to said walls and said soft metal member, whereby the metal thereof flows through said perforations and fills interstices between said walls.

5. The method of joining two camera walls, including perforating said walls, placing said perforated walls in juxtaposition, placing a soft metal member having lugs thereon adjacent one of said perforated walls and locating said soft metal member by engaging a lug with a perforation, applying pressure to said walls and said metal member whereby the metal thereof flows through said perforations and fills interstices between said walls.

6. The method of joining two camera walls, including perforating said walls, the perforations of one of the said walls being countersunk, placing said perforated walls in juxtaposition, placing a soft metal member having lugs thereon adjacent one of said perforated walls and locating said soft metal member by engaging a lug with a perforation, applying pressure to said walls and said soft metal member whereby the metal thereof flows through said perforations and fills interstices between the said walls, thereby forming a joint and light-proofing in the same operation.

7. A camera casing comprising at least two walls, and a single fastening and light-proofing member for forming a joint between said walls.

8. A camera casing comprising at least two angularly disposed walls and a single fastening and light-proofing member for forming a joint between the angularly disposed walls.

9. A camera casing comprising at least two angularly disposed walls, one having a perforated flange overlying the other, and a single fastening and light-proofing member forced through said perforated flange, and forming a light-tight joint between them.

10. A camera casing comprising at least two angularly disposed walls, one having a perforated flange overlying the other, perforations in said other wall, and a single fastening and light-proofing member forced through said perforated flange and wall and forming a light-tight joint there between.

11. A camera casing comprising at least two angularly disposed walls, one having a perforated flange overlying the other, countersunk perforations in said other wall, and a single fastening and light-proofing member forced through said perforated flange and wall and forming a light-tight joint there between.

12. A camera casing comprising at least two walls, each having perforations therein, a joint for retaining said walls in a predetermined relation, including a fastening member forced through the perforations in the two walls.

13. A camera casing comprising at least two walls, one of said walls having a flange overlying the other, perforations in said flange and other wall, a joint for retaining said walls in a predetermined relation including a fastening member forced through the perforations in the two walls.

14. A camera casing comprising at least two walls, one of said walls having a flange overlying the other, perforations in said flange and other wall, a joint for retaining said walls in a predetermined relation including a fastening member forced through the perforations and interstices in and between the two walls, thereby making said joint light-proof.

15. A camera casing comprising at least two walls, one of said walls having a flange overlying the other, perforations in said flange and other wall, a joint for retaining said walls in a predetermined relation including a fastening member forced through the perforations and interstices in and between the two walls, thereby making said joint light-proof, said fastening member having at least one positioning lug to make a connection with a perforation to locate said fastening member relative to said camera walls.

16. A camera casing comprising at least two walls, one of said walls having a flange overlying the other, perforations in said flange and other wall, one set of said perforations being countersunk, a joint for retaining said walls as a predetermined relation including a fastening member forced through the perforations and interstices in and between the two walls, thereby making said joint light-proof, said fastening member having at least one positioning lug to make a connection with a perforation to locate said fastening member relative to said camera walls.

Signed at Rochester, New York this 22nd day of March 1930.

GEORGE W. ADAMS.